(12) United States Patent
Brown et al.

(10) Patent No.: US 8,915,511 B2
(45) Date of Patent: Dec. 23, 2014

(54) EASILY ASSEMBLABLE TWO WHEELED VEHICLE FOR HEAVY CARGO TRANSPORT

(71) Applicants: Bob Brown, Saint Paul, MN (US);
Mark Stonich, Minneapolis, MN (US);
Lloyd Keleny, Champlin, MN (US);
John Hehre, Minneapolis, MN (US);
Raymond Menard, Hastings, MN (US)

(72) Inventors: Bob Brown, Saint Paul, MN (US);
Mark Stonich, Minneapolis, MN (US);
Lloyd Keleny, Champlin, MN (US);
John Hehre, Minneapolis, MN (US);
Raymond Menard, Hastings, MN (US)

(73) Assignee: Cheetah Development, Inc., Hastings, MN (US)

( * ) Notice: Subject to any disclaimer, the term of this patent is extended or adjusted under 35 U.S.C. 154(b) by 18 days.

(21) Appl. No.: 13/631,374

(22) Filed: Sep. 28, 2012

(65) Prior Publication Data
US 2013/0264793 A1    Oct. 10, 2013

Related U.S. Application Data

(60) Provisional application No. 61/540,333, filed on Sep. 28, 2011.

(51) Int. Cl.
*B62K 19/00*    (2006.01)
*B62K 7/02*    (2006.01)
*B62K 19/06*    (2006.01)

(52) U.S. Cl.
CPC .. *B62K 19/06* (2013.01); *B62K 7/02* (2013.01)
USPC ...................................................... 280/281.1

(58) Field of Classification Search
CPC .............................. B62K 19/06; B62K 11/04
USPC ............................................... 280/274, 281.1
See application file for complete search history.

(56) References Cited

U.S. PATENT DOCUMENTS

| | | | | | |
|---|---|---|---|---|---|
| 607,075 | A | * | 7/1898 | Peterson | ......................... 74/47 |
| 1,117,916 | A | * | 11/1914 | Schmidt | ....................... 403/174 |
| 4,561,670 | A | * | 12/1985 | Takada | ....................... 280/281.1 |
| 5,122,210 | A | * | 6/1992 | Kubomura et al. | ............. 156/78 |
| 5,255,932 | A | * | 10/1993 | Moore | ....................... 280/281.1 |
| 5,423,728 | A | * | 6/1995 | Goldberg | ........................ 482/57 |

* cited by examiner

*Primary Examiner* — Tony Winner
(74) *Attorney, Agent, or Firm* — Schwegman Lundberg & Woessner, P.A.

(57) ABSTRACT

One embodiment includes a bicycle frame that includes a plurality of square cross-section tubing members, wherein all tubing members are straight, and are consistent in cross-sectional dimensions along their length and wherein each tubing member is cut to length with a straight cut defining a tubing opening formed by an edge that extends along a single plane.

20 Claims, 8 Drawing Sheets

EASILY ASSEMBLABLE TWO WHEELED VEHICLE FOR HEAVY CARGO TRANSPORT

RELATED APPLICATIONS

This patent application claims the benefit of priority, under 35 U.S.C. §119(e), to U.S. Provisional Patent Application Ser. No. 61/540,333, filed on Sep. 28, 2011, which is incorporated herein by reference in its entirety.

BACKGROUND

Poor, rural areas often do not have access to efficient modes of Transportation—especially modes of transportation that allow for the transport of heavy cargo. What is needed is a system and method to enable persons to transport heavy cargo using man power. In order to have the biggest impact at the lowest cost, such system and method needs to be able to be produced with developing nations.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

Figure 1:
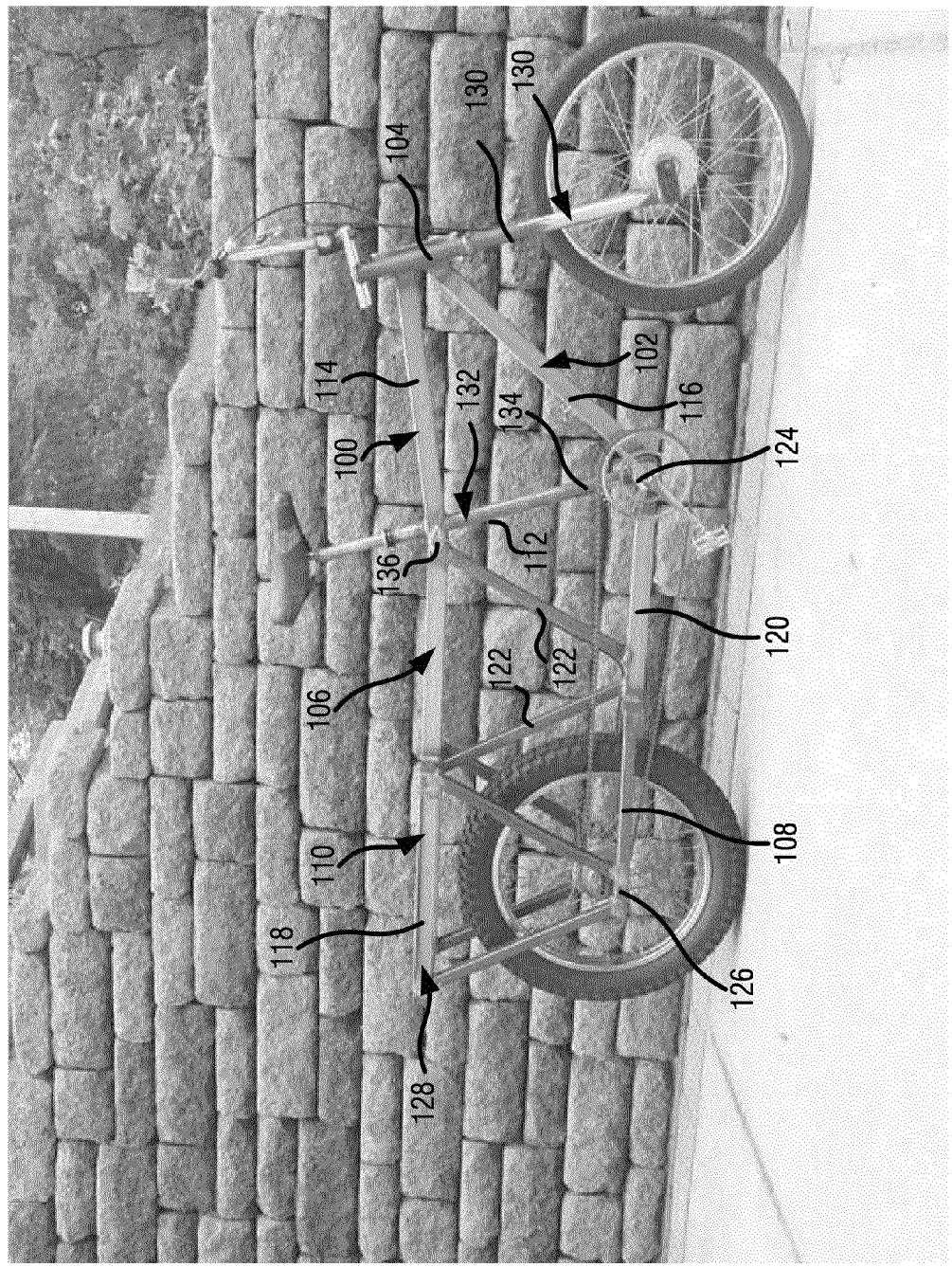
FIG. 1 shows a perspective view of a bicycle, according to an embodiment.
Figure 2:
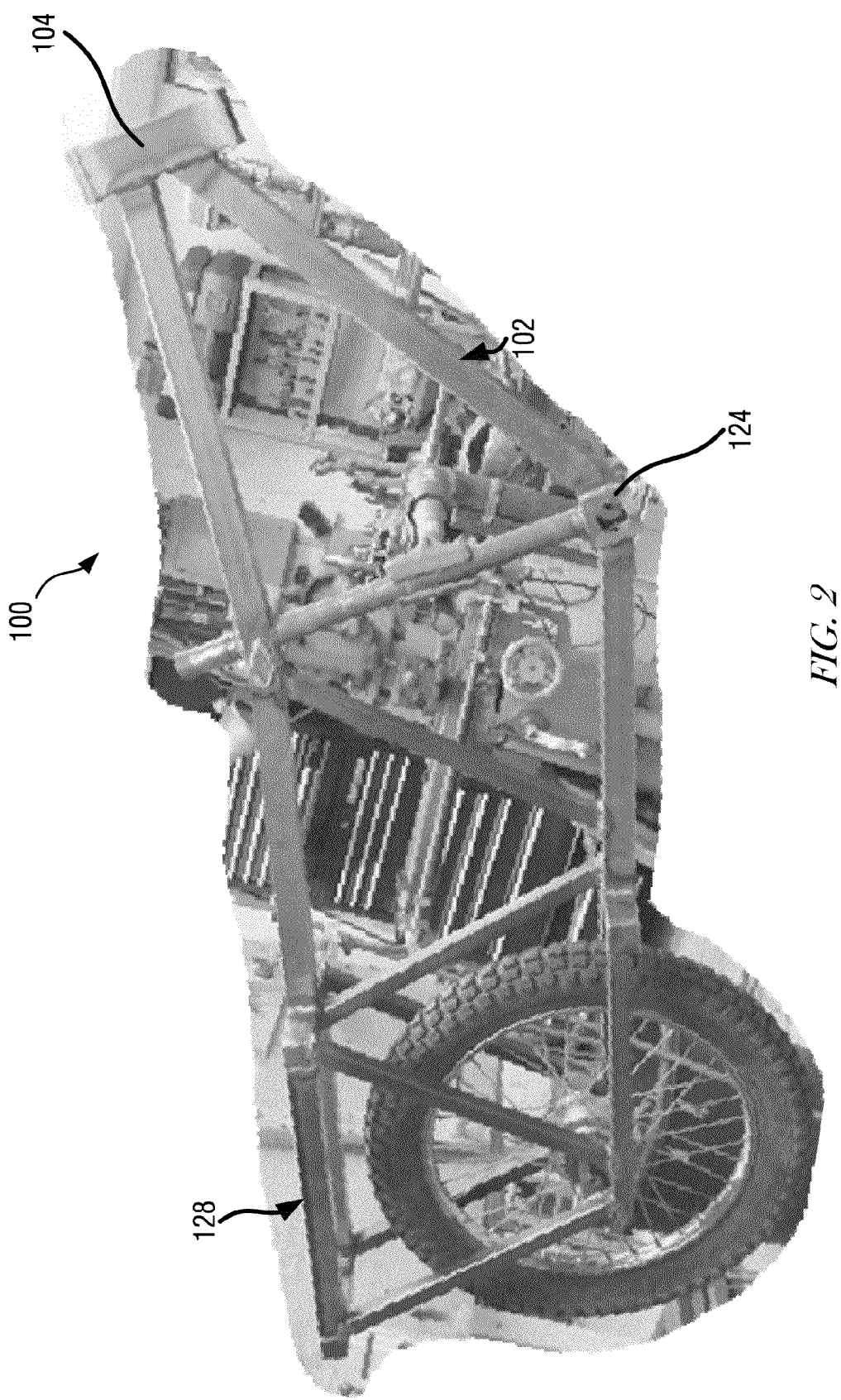
FIG. 2 shows the bicycle of FIG. 1, partially disassembled.

FIG. 1 shows a perspective view of a bicycle frame 100, according to an embodiment. FIG. 2 shows the bicycle of FIG. 1, partially disassembled. Various embodiments include a bicycle frame 100 including a plurality tubing members. In some embodiments, all of the plurality of tubing members are of a square cross-section. Some embodiments include tubing members having a circular cross section, or some other shape. In some embodiments, all tubing members are consistent in cross-sectional dimensions along their length.

In some embodiments, all tubing members are straight. In some embodiments, each tubing member is cut to length with a straight cut, such as a cut defining a tubing opening formed by an edge that extends along a single plane. In some embodiments, the frame 100 is formed such that there are no curvilinear joints are formed between tubing members. Embodiments are included wherein no tubing member opening, that is part of a joint between two tubing members, is curvilinear. In some embodiments, no joint includes a fish-mouth shaped joint. Embodiments are included wherein no two tubing members are joined together at a curvilinear seam. In some embodiments, no two tubing members are joined together at a curvilinear opening of one of the two tubing members.

Various embodiments include bicycle frame 100, including a main triangle 102. Various embodiments include a head tube 104 located at a front portion of the main triangle 102. Various embodiments include one or more seat stays or rear top tube 106. Various embodiments include one or more chain stays 108.

In some embodiments, the main triangle 102 includes a seat tube 112. Although the pictured seat tube has a round cross section, the present subject matter is not limited as such, and includes square cross sections, embodiments with no seat tube at all, in which the seat is coupled to some other part of the bicycle, and other configurations. In some embodiments, the seat tube has a square cross section, with caps that are drilled to receive a cylindrical seat post.

In some embodiments, the main triangle 102 includes a top tube 114. In some embodiments, the main triangle 102 includes a down tube 116. In some embodiments, the top tube 114 and the down tube 116 are joined to the head tube 104. In some embodiments, one or both the top tube 114 and the down tube 102 have a square cross section.

Embodiments are included wherein the seat stays or rear top tube 106 are coupled to a top portion 132 of the seat tube 112 proximal the top tube 114. In some embodiments, the chain stays 108 are coupled to a bottom portion 134 of the seat tube 112 proximal the down tube 116. Embodiments are included wherein the horizontal member 120, the seat tube 112 and the down tube 116 are coupled at the bottom bracket tube 124. In an example, the horizontal member 120 includes a boom tube or bottom tube.

Various embodiments include a truss 110. In some embodiments the truss is planar, and in some it forms a space frame, such as to extend to two sides of a wheel. In some embodiments, the truss 110 is coupled to the seat tube 112. In some embodiments, the truss 110 is coupled to the top tube 114. In some embodiments, the truss 110 is coupled to the down tube 116. In some embodiments, the truss includes a top horizontal member 118 and a bottom horizontal member 120. In some embodiments, the top 118 and bottom 120 horizontal members are substantially parallel, although other angles are possible. Some embodiments include one or more coupling members 122. In some embodiments, the one or more coupling members 122 zigzag between the horizontal members 118, 120. According to several embodiments, the zigzag defines triangular shapes between the horizontal members 118, 120.

In some embodiments, the truss 110 extends between a bottom bracket tube 124 and at a rear fork 126. Embodiments are included wherein the chain stays 108 form a part of a bottom member 120. In some embodiments, the seat stays or rear top tube 106 form a part of the truss. Embodiments are included wherein the top member 118 of the horizontal members forms a rack 128. In some embodiments, the rack 128 is sized to support a load of at least 450 kilograms, for example while it is in motion on a rough surface.

In some embodiments, the frame is made by the process including cutting the tubing members to length with a straight cut. In some embodiments, the frame is made by joining the tubing members at seams that are substantially linear. Embodiments are included wherein joining includes welding. Embodiments are included wherein joining includes gas welding by combusting a combination of oxygen and acetylene gas. Embodiments are included wherein joining includes welding by wire-feed metal inert gas system (MIG). Embodiments are included wherein joining includes welding by arc welding with sticks. Embodiments are included wherein cutting includes hack-saw cutting by hand. Other excise methods are possible, including, but not limited to, cutting with a cut off saw, a band saw or another saw. Some embodiments include supporting two frame members at a seam, such as by covering them with a patch, such as patch 136.

In some embodiments, the frame is made by the process including welding caps to each opening of a square head tube 104 and drilling the caps. In some embodiments, the frame is made by the process including welding caps to each opening of a square bottom bracket tube 124, and drilling the caps. Embodiments are included wherein drilling the caps includes hand-drilling the caps. Bearings, bottom brackets or other components mate to the caps, in some embodiments. In some examples, the bicycle 100 can be assembled with small hand tools, such as a drill and saw, and a gas welder.

Figure 3:
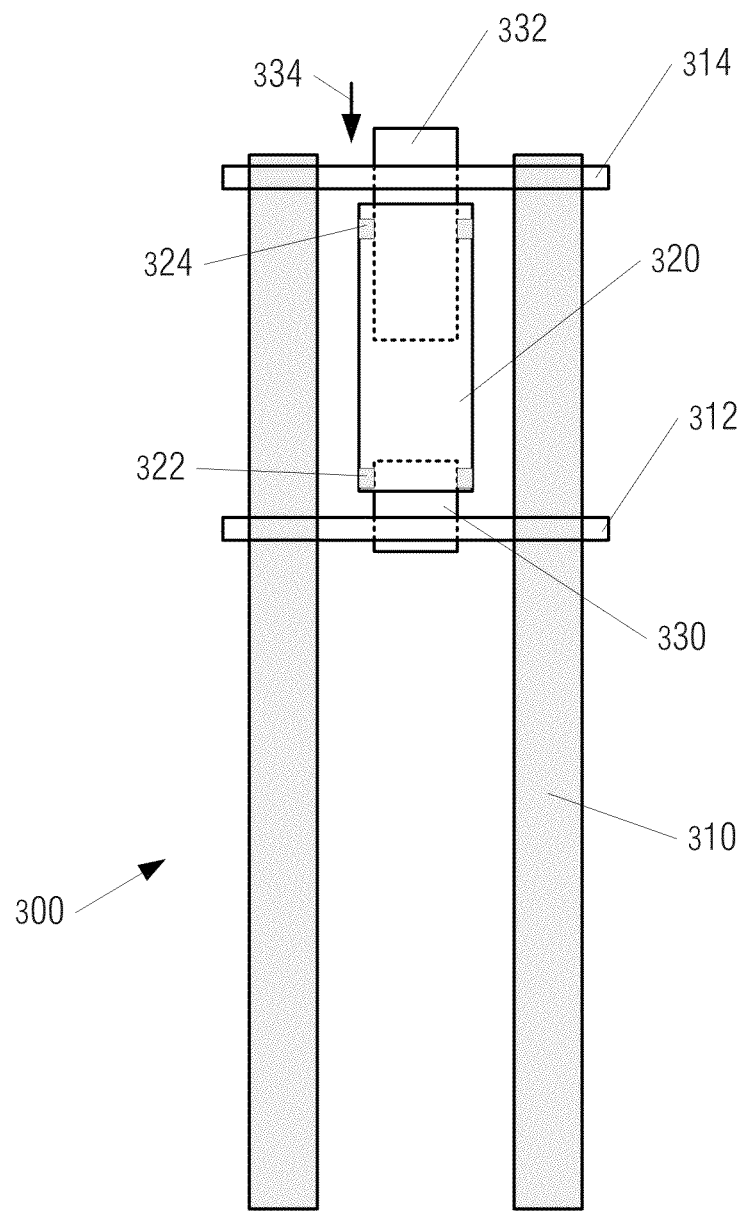
FIG. 3 shows a fork rotably mounted to a head tube according to an embodiment.
Figure 4:
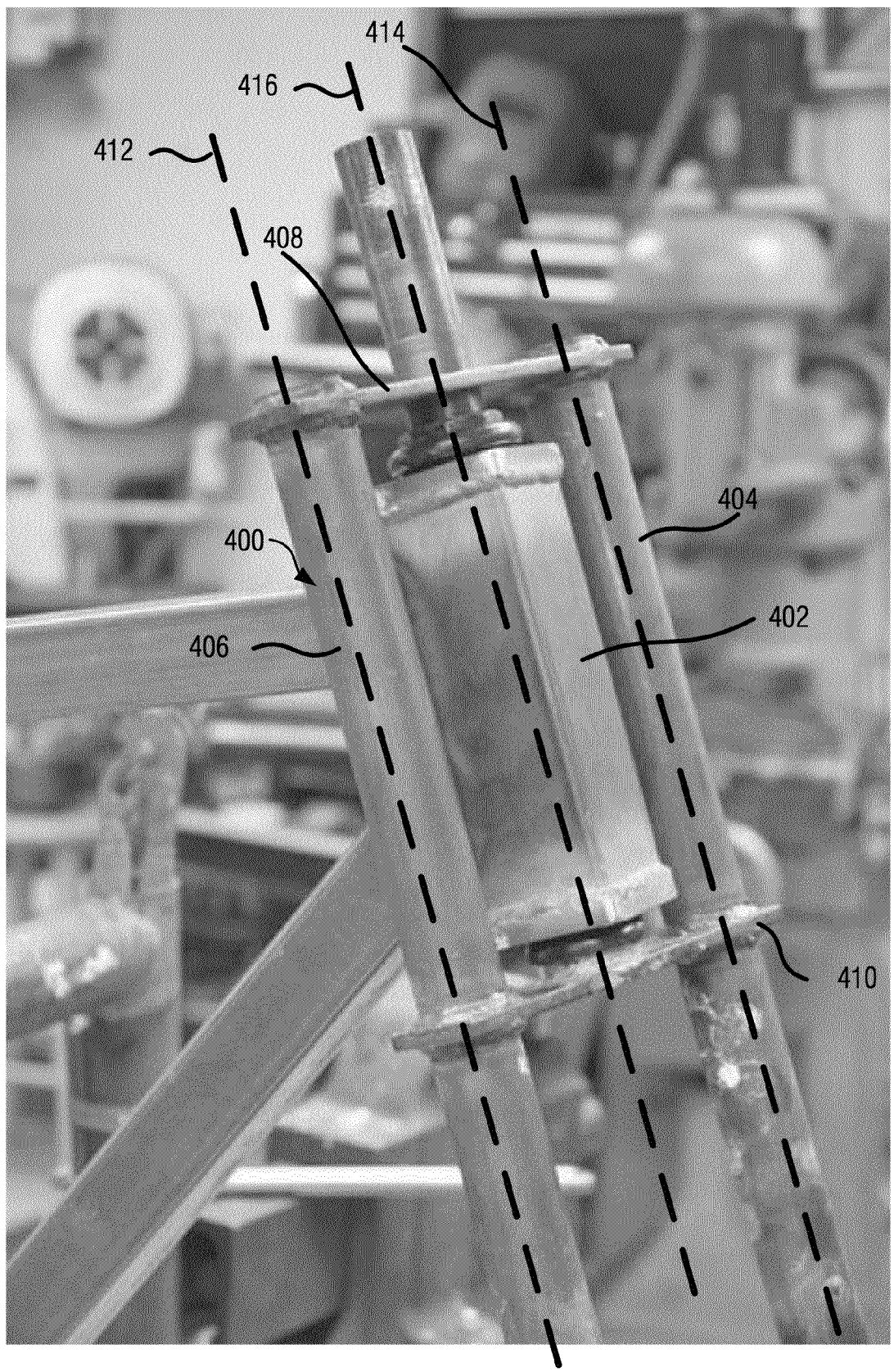
FIG. 4 shows a perspective view of a bicycle assembly including a fork, according to an embodiment.
Figure 5:
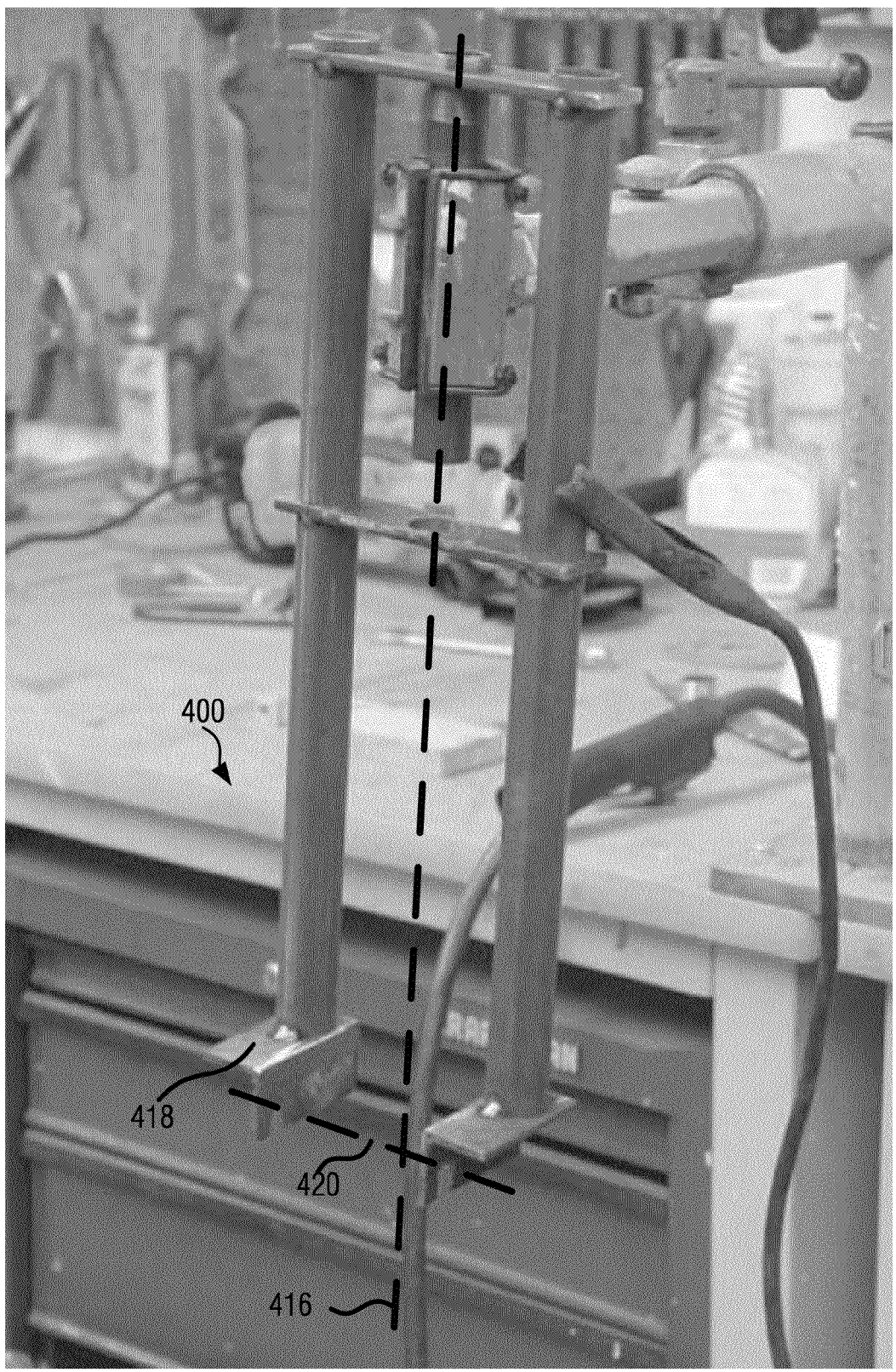
FIG. 5 shows a disassembled portion the assembly of FIG. 4, according to an embodiment.
Figure 6:
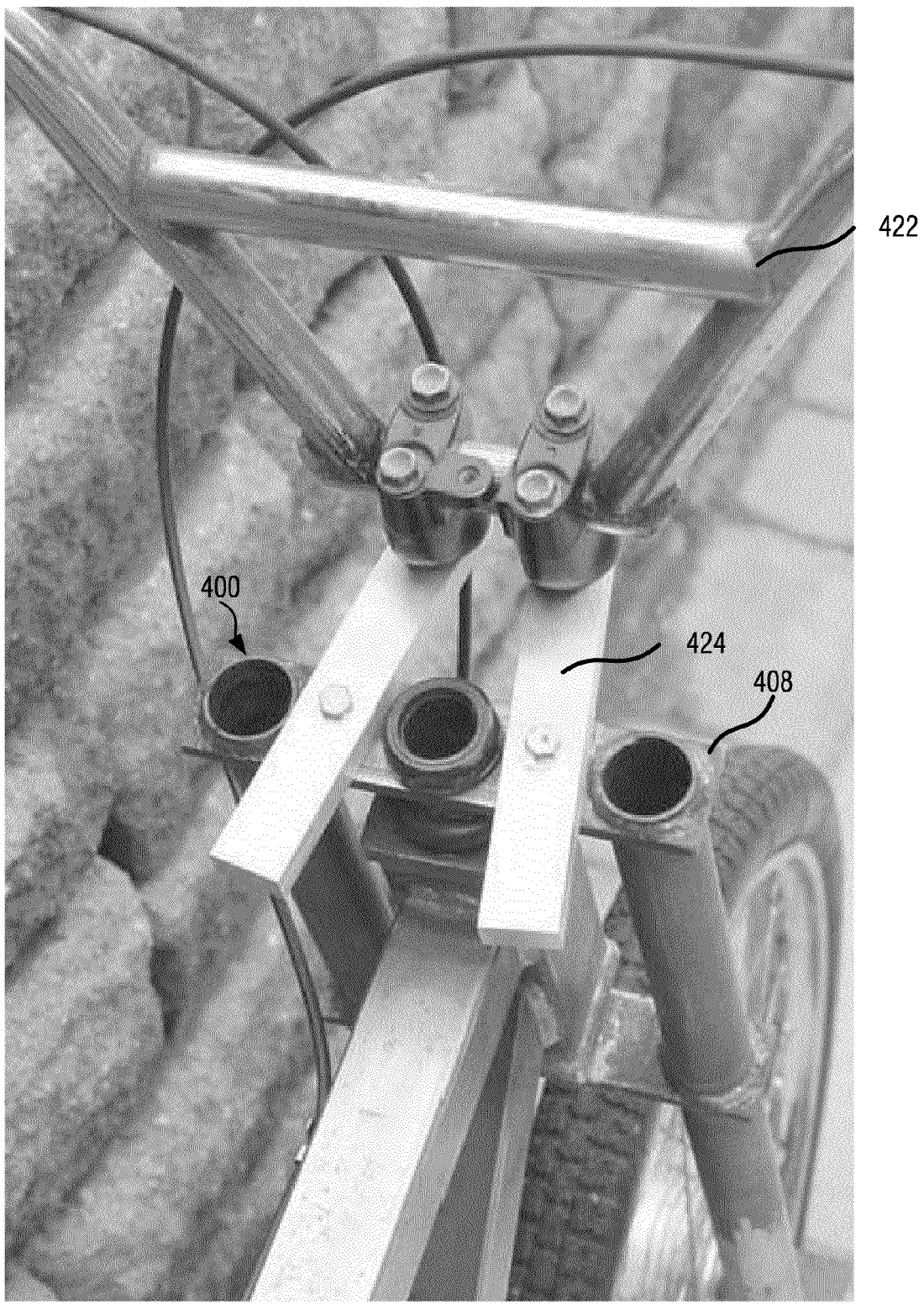
FIG. 6 shows a top perspective view of the assembly of FIG. 4, coupled with a handlebar.

FIG. 3 shows a fork 300 rotably mounted to a head tube 320 according to an embodiment of the invention. The fork 300 includes a pair of fork blades 310 spaced apart a distance that is adapted to accept a front wheel (not shown). The fork blades 310 are welded to a top crown 314 and a bottom crown 312.

An upper bearing race 324 and a lower bearing race 322 are shown within the head tube 320. A two part steer tube is shown coupling the fork 300 to the head tube 320, by engaging the upper and lower bearing races 324, 322. A first part 330 of the two part steer tube is welded to the bottom crown 312. A second part 332 of the two part steer tube is inserted through the top crown 314 into the upper bearing race 324 as indicated by arrow 334. In one embodiment, the second part 332 of the two part steer tube is threaded through the top crown 314 into the upper bearing race 324.

By using a two part steer tube, the fork 300 can be welded together before assembly with both the top crown 314 and the bottom crown 312 welded in place. To assemble the fork 300 to the head tube 320, the first part 330 of the two part steer tube is angled into the lower bearing race 322, then the top crown 314 is moved over a top portion of the head tube 320. Then, once aligned, the second part 332 of the two part steer tube is threaded or otherwise inserted into the upper bearing race 324 as indicated by arrow 334.

Fork and frame configurations as described are extremely strong due in part to the inclusion of both a bottom crown 312 and a top crown 314. The fork 300 is easy to fabricate, as it can be welded together on a flat surface, without any jigs to hold components in place during welding.

FIGS. 4-7 show a bicycle assembly including a fork, according to an embodiment. Various embodiments include a fork 400 coupled to a main triangle (e.g., 102 in FIGS. 1-2), such as at a head tube 402. In various embodiments, the fork 400 includes a pair of fork tubes 404, 406. In various embodiments, an upper fork crown 408 is welded to the pair of fork tubes 404, 406. In various embodiments, the upper fork crown 408 is located above the head tube 402. In various embodiments, a lower fork crown 410 is welded to the pair of fork tubes 404, 406. In various embodiments, the lower fork crown 410 is located below the head tube 404.

In some embodiments, each of the pair of fork tubes extends along a respective axis 412, 414 that is parallel to a head tube axis 414 of the head tube, with each of the pair of fork tubes coupled to an axle retainer defining an axle aperture. Embodiments are included wherein the axle retainer 418 extends away from each of the fork tubes such that an axle centerline 420 extending through each axle aperture is offset from the head tube axis 416. In some embodiments, the axle centerline is perpendicular to the head tube axis. Some embodiments include a handlebar 422. I some embodiments, the handlebar is coupled to the upper fork crown 408 with one or more extenders 424.

Figure 7:
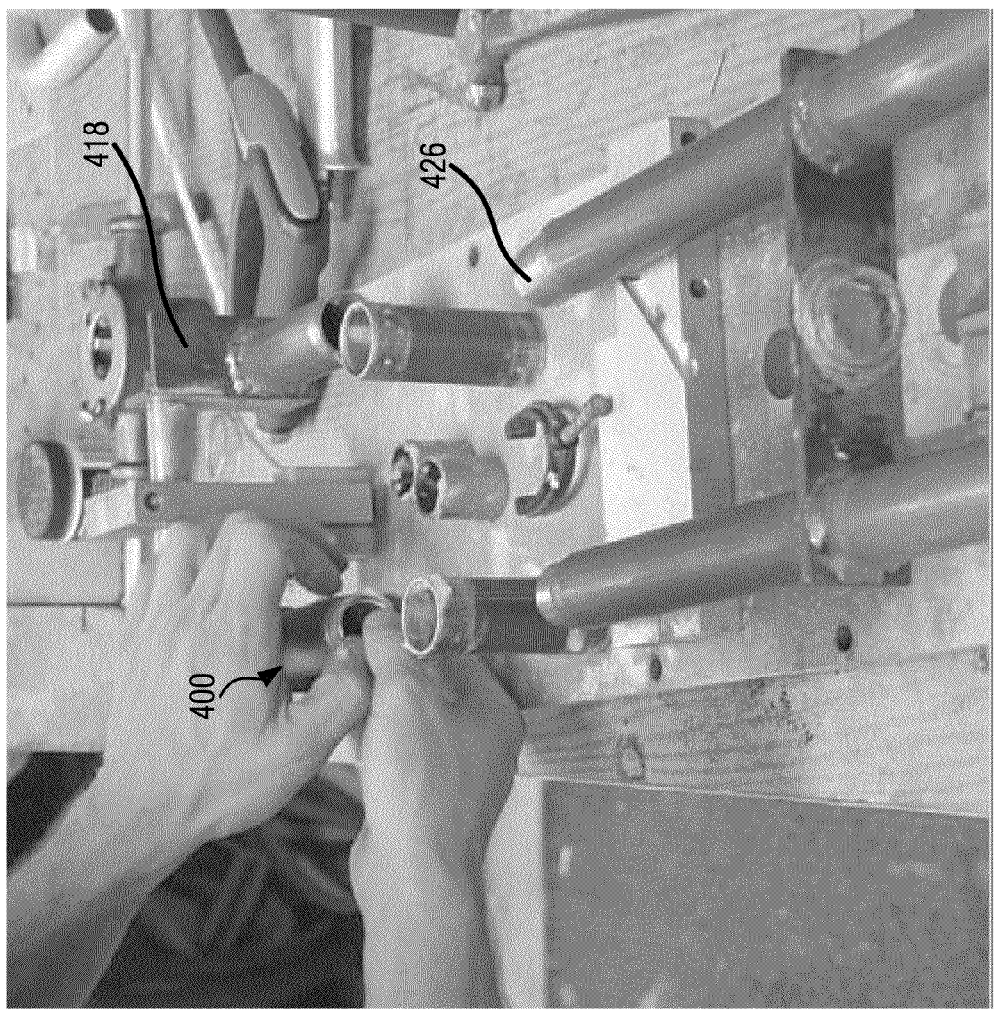
FIG. 7 shows a perspective view of the assembly of FIG. 4, partially disassembled.

FIG. 7 shows the fork 400 in pieces. In various embodiments, inserts 426 are used to couple parts of the fork tubs 404, 406 together. Such inserts enable an assembler to align pieces without relying exclusively on a jig.

Figure 8:
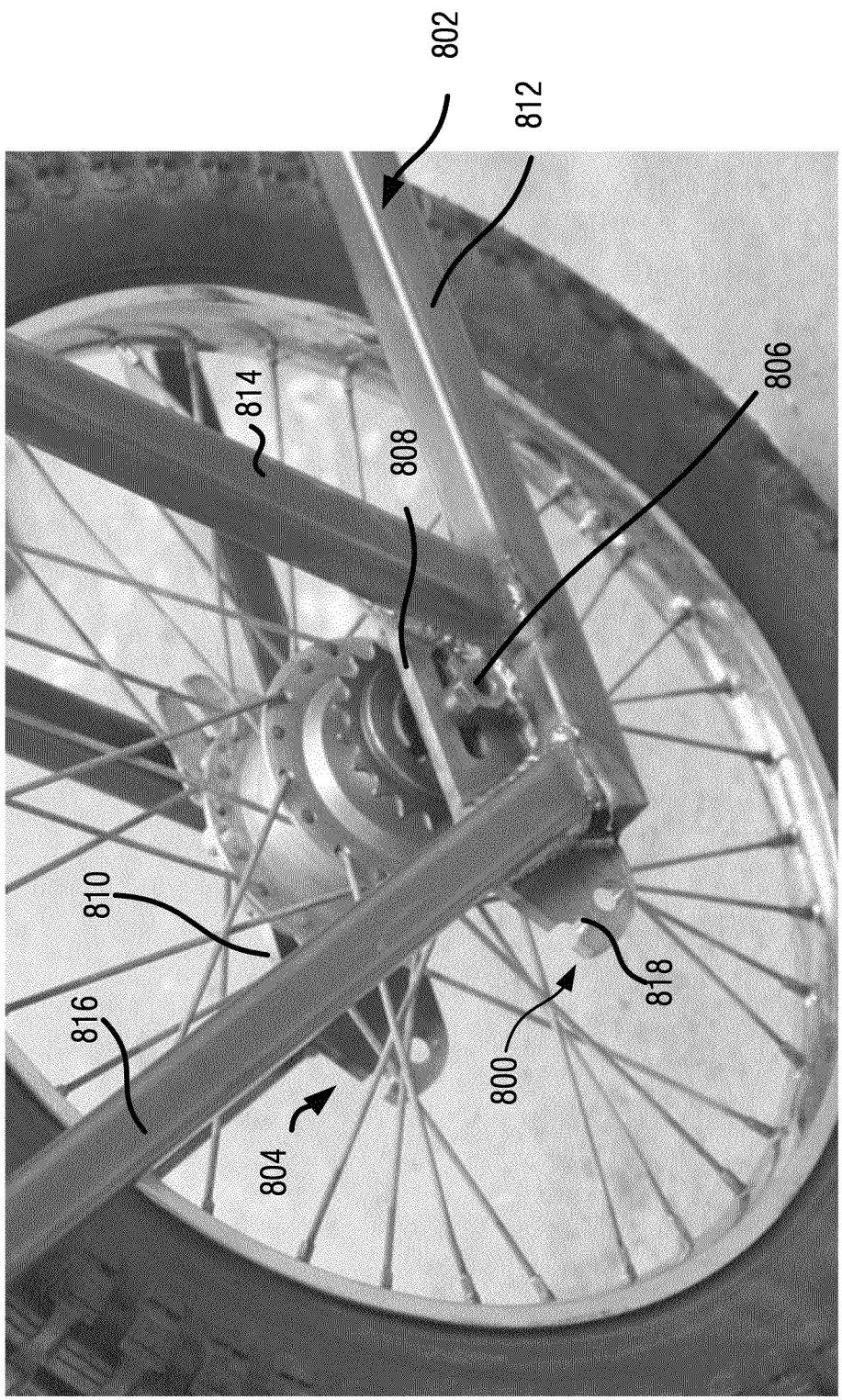
FIG. 8 shows a perspective view of a bicycle rear fork, according to an embodiment.

FIG. 8 shows a perspective view of a bicycle rear fork 800, according to an embodiment. Embodiments are included wherein the rear fork comprises two fork sides 802, 804 to be coupled to each side of a wheel axle 806. In some embodiments, each side 802, 804 includes a respective plate 808, 810.

In some embodiments, a plate 808 is joined between a chain stay 812 and at least one of a coupling member of a truss. In some embodiments, the plate 808 is joined between two coupling members 814, 816 and a bottom horizontal member of a truss, such as one that includes a chain stay 812. Embodiments are included wherein plate 808 is parallel to plate 810, although the present subject matter is not so limited. In some embodiments, each plate defines an axle aperture through which the axle 806 passes.

Some embodiments include a kick-stand mount 818. Some embodiments use a single kick-stand, while some use a double kick-stand that extends beneath the tire.

While a number of embodiments of the invention are described, the above lists are not intended to be exhaustive. Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon studying the above description.

What is claimed is:

1. A bicycle frame, comprising:
 a plurality of square cross-section tubing members;
 wherein at least some of the tubing members are straight, and are consistent in cross-sectional dimensions along their lengths; and
 wherein each tubing member is cut to length with a straight cut defining a tubing opening formed by an edge that extends along a single plane, and wherein the tubing members are joined together without any frame lugs.

2. The bicycle of claim 1, wherein no curvilinear joints are formed between tubing members.

3. The bicycle of claim 1, wherein no joint includes a fish-mouth shaped joint.

4. The bicycle of claim 1, wherein no two tubing members are joined together at a curvilinear seam.

5. The bicycle of claim 1, wherein no two tubing members are joined together at a curvilinear opening of one of the two tubing members.

6. A bicycle frame, comprising:
 a main triangle with a head tube located at a front portion of the main triangle;
 a pair of rear top tubes;
 a pair of rear bottom tubes;
 a fork coupled to the main triangle, the fork comprising:
  a pair of fork tubes;
  an upper fork crown welded to the pair of fork tubes, and located above the head tube;
  a lower fork crown welded to the pair of fork tubes, and located below the head tube;

a headset bearing located on the head tube;

a two part steer tube, wherein a first part is welded to the lower fork crown, and a second part is removeably inserted into the headset bearing through the upper fork crown.

7. The bicycle of claim 6, wherein the main triangle includes a seat tube, a top tube, and a down tube, with the top tube and the down tube joined to the head tube, wherein the rear top tubes are coupled to a top portion of the seat tube proximal the top tube, wherein the rear bottom tubes are coupled to a bottom portion of the seat tube proximal the down tube and wherein the rear bottom tubes, the seat tube and the down tube are coupled at a bottom bracket tube.

8. The bicycle of claim 7, comprising a truss coupled to seat tube, the top tube and the down tube, the truss including substantially parallel horizontal members, with coupling members that zigzag between the substantially parallel horizontal members, the truss extending between the bottom bracket tube and a rear fork.

9. The bicycle of claim 8, wherein the rear bottom tubes form a part of a bottom horizontal member of the substantially parallel horizontal members.

10. The bicycle of claim 8, wherein the rear top tubes form a part of the truss.

11. The bicycle of claim 8, wherein a top horizontal member of the substantially parallel horizontal members forms a rack.

12. The bicycle of claim 8, wherein the rear fork comprises two fork sides to be coupled to each side of a wheel axle, with each side comprising a plate joined between a rear bottom tube and at least one of the coupling members.

13. The bicycle of claim 12, wherein the plate is joined between two coupling members and a bottom horizontal member of the substantially parallel horizontal members.

14. The bicycle of claim 12, wherein each plate defines an axle aperture.

15. The bicycle of claim 7, wherein the top tube and the down tube have a square cross section.

16. The bicycle of claim 6, wherein each of the pair of fork tubes extends along an axis that is parallel to a head tube axis of the head tube, with each of the pair of fork tubes coupled to an axle retainer defining an axle aperture, wherein the axle retainer extends away from each of the fork tubes such that an axle centerline extending through each axle aperture is offset from the head tube axis and wherein the axle centerline is perpendicular to the head tube axis.

17. A bicycle frame formed of a plurality of square cross-section tubing members, wherein the tubing members are straight, are consistent in cross-sectional dimensions along their lengths and are joined on each end along tubing openings that define a single plane, wherein the frame is made by a process comprising:

cutting the tubing members to length with a straight cut; and joining the tubing members without any frame lugs at seams that are substantially linear.

18. The bicycle of claim 17, wherein joining includes welding, wherein joining includes gas welding by combusting a combination of oxygen and acetylene gas.

19. The bicycle of claim 17, wherein cutting includes hacksaw cutting by hand.

20. The bicycle of claim 17, wherein the frame includes a square head tube and a square bottom bracket tube, the square head tube and square bottom bracket tube each including caps with holes in them.

* * * * *